United States Patent
Tsuchiya et al.

(10) Patent No.: US 9,558,768 B1
(45) Date of Patent: Jan. 31, 2017

(54) SUSPENSION STANDOFF GEOMETRY FOR SLIDER CROWN CHANGE REDUCTION

(71) Applicant: HGST Netherlands B.V., Amsterdam (NL)

(72) Inventors: Tatsumi Tsuchiya, Ayase (JP); Hiroyasu Tsuchida, Fujisawa (JP); Hideto Imai, Yokohama (JP); Naoki Suzuki, Yokohama (JP); Yukihiro Nakamura, Fujisawa (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/850,615

(22) Filed: Sep. 10, 2015

(51) Int. Cl.
*G11B 5/48* (2006.01)
*G11B 5/127* (2006.01)

(52) U.S. Cl.
CPC ........... *G11B 5/4826* (2013.01); *G11B 5/1272* (2013.01)

(58) Field of Classification Search
None
See application file for complete search history.

(56) References Cited

U.S. PATENT DOCUMENTS

| | | | |
|---|---|---|---|
| 5,636,088 A | 6/1997 | Yamamoto et al. | |
| 5,880,908 A | 3/1999 | Shiraishi et al. | |
| 5,936,806 A | 8/1999 | Pan et al. | |
| 6,078,472 A | 6/2000 | Mitoh et al. | |
| 6,282,063 B1 | 8/2001 | Coon | |
| 6,700,746 B1 | 3/2004 | Brandt et al. | |
| 6,801,398 B1 | 10/2004 | Ohwe et al. | |
| 7,002,780 B2 * | 2/2006 | Rancour | G11B 5/4826 360/234.6 |
| 7,474,508 B1 | 1/2009 | Li et al. | |
| 7,545,605 B2 | 6/2009 | Hagiya et al. | |
| 7,729,089 B1 * | 6/2010 | Hogan | G11B 5/4826 360/234.6 |
| 7,859,793 B2 * | 12/2010 | Uematsu | G11B 5/4826 360/234.5 |
| 7,995,310 B1 | 8/2011 | Pan | |
| 8,085,503 B2 | 12/2011 | Feng | |
| 8,264,796 B2 | 9/2012 | Wei et al. | |
| 8,582,243 B2 | 11/2013 | Feng et al. | |

(Continued)

FOREIGN PATENT DOCUMENTS

JP 11273289 A * 10/1999
JP 2002150734 A * 5/2002

(Continued)

OTHER PUBLICATIONS

English-machine translation of JP 11273289A to Hashimoto et al., published on Oct. 8, 1999.*

(Continued)

*Primary Examiner* — Will J Klimowicz
(74) *Attorney, Agent, or Firm* — John D. Henkhaus

(57) ABSTRACT

A head gimbal assembly for a hard disk drive comprises a flexure having a planar surface and a standoff structure extending from the planar surface, where the standoff structure includes a monolithic element. A head slider in which a read-write head is housed is adhered to the flexure with an adhesive, such that the adhesive surrounds the monolithic element so that the monolithic element may absorb strain energy caused by curing of the adhesive.

8 Claims, 6 Drawing Sheets

(56) References Cited

U.S. PATENT DOCUMENTS

2006/0187584 A1* 8/2006 Watanabe ............ G11B 5/4826
360/234.5
2006/0203389 A1* 9/2006 Motonishi ............ G11B 5/4826
360/234.6

FOREIGN PATENT DOCUMENTS

| JP | 2003141840 A | * | 5/2003 | |
|---|---|---|---|---|
| JP | 2006236449 A | * | 9/2006 | |
| JP | 2006252657 A | * | 9/2006 | |
| JP | 5131140 B2 | * | 1/2013 | |
| WO | WO 9610820 A1 | * | 4/1996 | ............. G11B 21/16 |

OTHER PUBLICATIONS

W. Childers, Integrated Suspension Assembly with Reduced Slider Distortion, ip.com, Oct. 1, 1996, 2 pages, ip.com Disclosure No. IPCOM000118160D, IBM, US, dowloaded from: https://priorart.ip.com/IPCOM/000118160.

A. Aoyagi, Slider/Flexure Attaching Method to Reduce Deformation by Thermal Expansion, ip.com, Feb. 1, 1993, 2 pages, ip.com Disclosure No. IPCOM000103916D, IBM, US, downloaded from: https://priorart.ip.com/IPCOM/000103916.

A. Aoyagi, Slider/Flexure Attaching Method Using Polymer Sheet, ip.com, May 1, 1993, 2 pages, ip.com Disclosure No. IPCOM000104699D, IBM, US, downloaded from: https://priorart.ip.com/IPCOM/000104699.

* cited by examiner

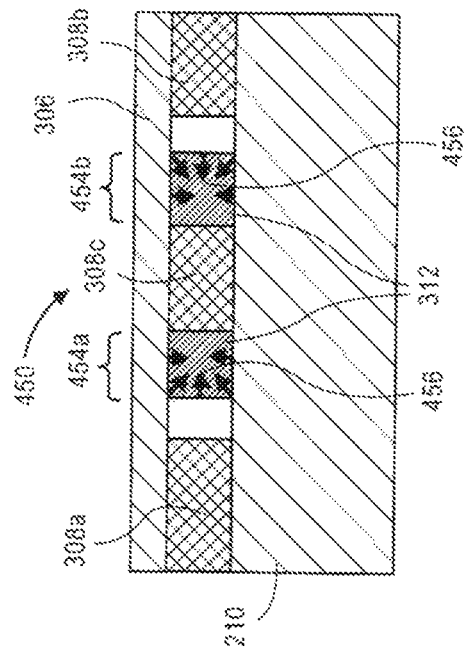
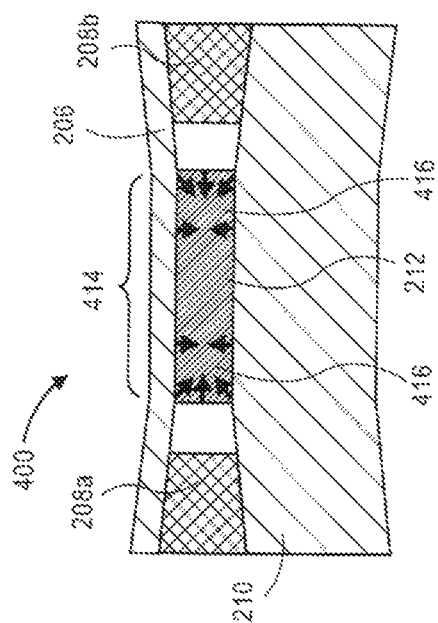
FIG. 4A
FIG. 4B

SUSPENSION STANDOFF GEOMETRY FOR SLIDER CROWN CHANGE REDUCTION

FIELD OF EMBODIMENTS

Embodiments of the invention may relate generally to hard disk drives and more particularly to reducing slider crown change associated with the assembly process and/or thermal changes.

BACKGROUND

A hard-disk drive (HDD) is a non-volatile storage device that is housed in a protective enclosure and stores digitally encoded data on one or more circular disk having magnetic surfaces. When an HDD is in operation, each magnetic-recording disk is rapidly rotated by a spindle system. Data is read from and written to a magnetic-recording disk using a read-write head that is positioned over a specific location of a disk by an actuator. A read-write head uses a magnetic field to read data from and write data to the surface of a magnetic-recording disk. A write head makes use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

The read-write head is fabricated within a head slider, which is coupled with a suspension in a head gimbal assembly (HGA) assembly process. Often an adhesive is used to adhere the head slider to the suspension. Thus, upon curing and hardening of the adhesive, the adhesive may undergo shrinkage. Such shrinkage may impart energy into the head slider, which may cause undesirable deformation of the head slider.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are generally directed at a head gimbal assembly (HGA) for a hard disk drive (HDD), an HDD comprising such an HGA, and a method of manufacturing an HGA to inhibit deformation of a head slider. The HGA comprises a flexure having a planar surface and a standoff structure extending from the planar surface, where the standoff structure includes a monolithic element. A head slider in which a read-write head is housed is adhered to the flexure with an adhesive, such that the monolithic element is surrounded by the adhesive so that the monolithic element may absorb strain energy caused by curing of the adhesive.

Embodiments include various positions for the monolithic element of the standoff structure, as well as various locations for the adhesive relative to the monolithic element, in order to overcome adhesive curing-related strain that might otherwise cause deformation of the head slider.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 4A is a side view illustrating a flexure-slider assembly of an HGA, undergoing delta crown;

FIG. 4B is a side view illustrating a flexure-slider assembly of an HGA, undergoing delta crown, according to an embodiment;

DETAILED DESCRIPTION

Approaches to a head gimbal assembly (HGA) are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of an Illustrative Operating Context

Embodiments may be used in the context of a head gimbal assembly (HGA) for a hard disk drive (HDD). Thus, in accordance with an embodiment, a plan view illustrating an HDD 100 is shown in FIG. 1 to illustrate an exemplary operating context.

Figure 1:
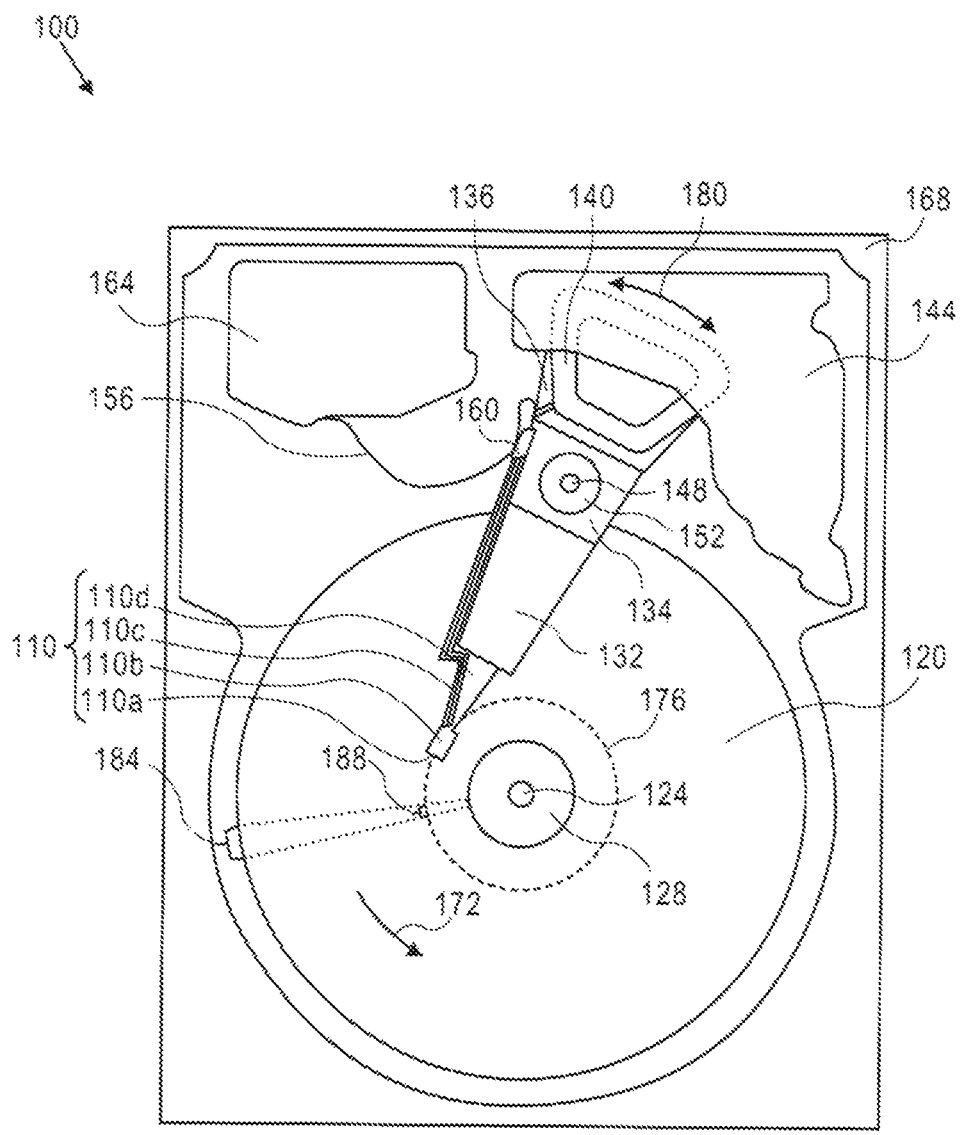
FIG. 1 is a plan view illustrating a hard disk drive (HDD), according to an embodiment.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one magnetic-recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110, to access portions of the medium 120, being mounted on a pivot-shaft 148 with an interposed pivot bearing assembly 152. In the case of an HDD having multiple disks, the carriage 134 is called an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE module 160 may be attached to the carriage 134 as shown. The flex cable 156 is coupled to an electrical-connector block 164, which provides electrical communication through electrical feed-throughs provided by an HDD housing 168. The HDD housing 168, also referred to as a base, in conjunction with an HDD cover provides a sealed, protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 commonly creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium or nitrogen for non-limiting examples, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector"), for example, sectored track portion 188. Each sectored track portion 188 may be composed of recorded data and a header containing a servo-burst-signal pattern, for example, an ABCD-servo-burst-signal pattern, which is information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass a data storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differs, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

The longitudinal out-of-plane curvature of a head slider, and of its corresponding air bearing surface (ABS), is commonly referred to as the "crown" of the slider. As discussed, with a head gimbal assembly (HGA) assembly process, upon curing and hardening of the adhesive, the adhesive may undergo shrinkage, which can impart strain energy into the head slider. Such strain may in turn cause undesirable deformation of the head slider, such as crown, camber, and/or twist types of deformation. Additionally, slider crown may also be caused by temperature changes during the lifecycle of a hard disk drive, because the suspension flexure and the slider are typically composed of different materials with different thermal expansion properties (e.g., stainless steel versus AlTiC). Regardless of whether a slider undergoes crown associated with adhesive curing (referred to herein as "delta crown") and/or crown associated with temperature change (referred to herein as "thermal crown"), both types of crown are likely to non-trivially alter the slider flying height, which refers to the nominal height at which the slider flies over the recording disk surface.

Figure 2:
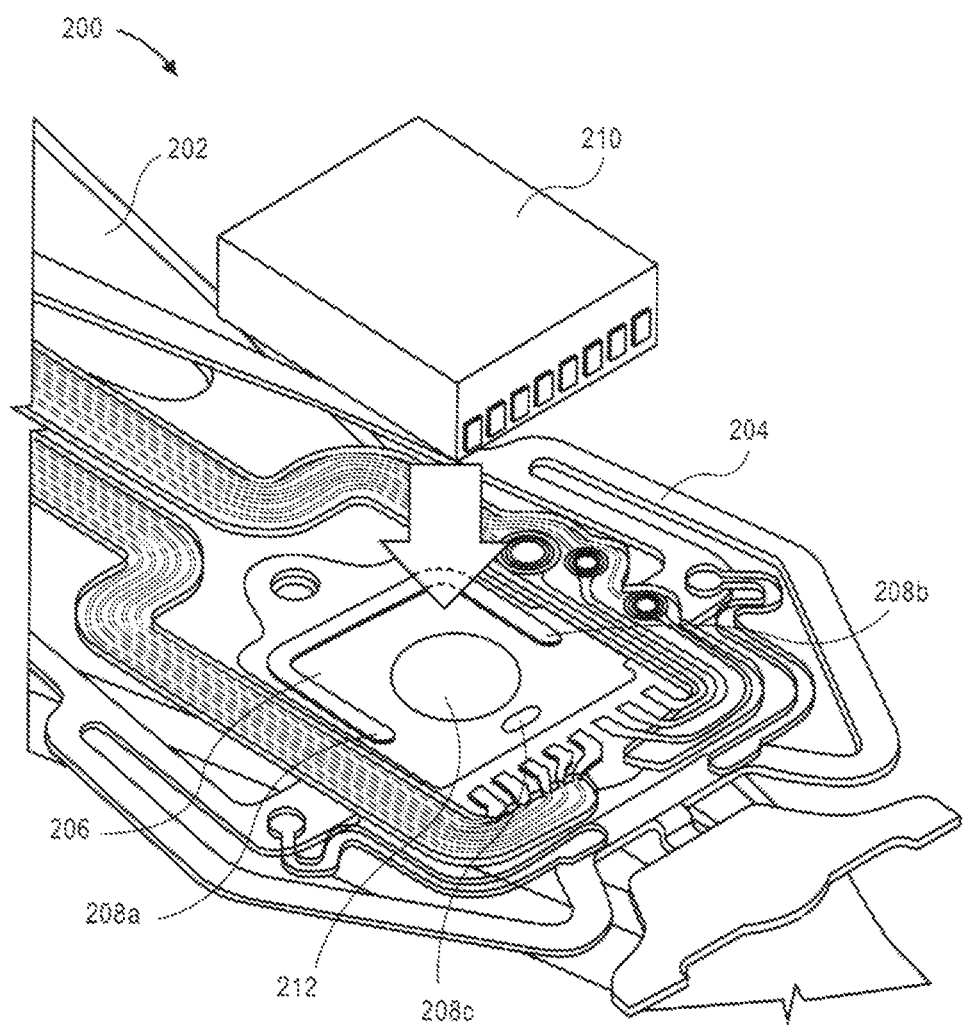
FIG. 2 is a top perspective view illustrating a head gimbal assembly (HGA), according to an embodiment.

FIG. 2 is a top perspective view illustrating a head gimbal assembly (HGA), according to an embodiment. HGA 200 comprises a suspension assembly comprising a load beam 202 and a flexure 204 with which a head slider 210 is coupled (e.g., see also slider 110b of FIG. 1). Flexure 204 comprises a slider attachment platform which herein is described as having a planar surface 206 and a standoff structure comprising a plurality of standoff elements 208a, 208b, 208c (referred to herein collectively as "standoff structure 208"). Slider 210 is attached to the planar surface 206 of flexure 204 using, for example, an adhesive 212. Such an assembly typically sandwiches the standoff structure 208 between the planar surface 206 and the slider 210, whereby the slider 210 "stands off" the planar surface 206 subject to the height and configuration of the standoff structure 208.

As noted, upon curing and hardening of the adhesive 212, the adhesive 212 may undergo shrinkage, which can impart strain energy into the head slider 210, where such strain may in turn cause undesirable crown deformation of the head slider 210, which is described in more detail in reference to FIG. 4A.

Suspension Standoff Geometry

In order to reduce the amount of strain energy that would otherwise be imparted to the slider 210 by way of the curing and corresponding shrinkage of the adhesive 212, and likewise to reduce the deformation of the slider 210 that might otherwise be caused by such shrinkage of the adhesive 212, a number of standoff structures and associated adhesive configurations are described, according to corresponding embodiments.

Figure 3A:
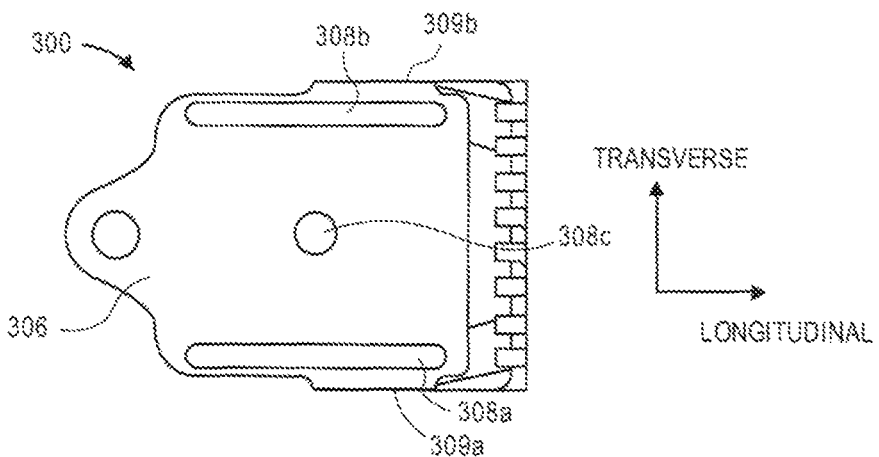
FIG. 3A is a top view illustrating a suspension flexure of an HGA, according to an embodiment.

FIG. 3A is a top view illustrating a suspension flexure of an HGA, according to an embodiment. More specifically, FIG. 3A illustrates a slider attachment platform 300 of a flexure, where the slider attachment platform comprises a planar surface 306 and a standoff structure comprising a plurality of standoff elements 308a, 308b, 308c (referred to herein collectively as "standoff structure 308") having a particular pattern or configuration.

According to an embodiment, standoff structure 308 comprises a monolithic element 308c. Therefore, a corresponding HGA incorporating a flexure having a slider attachment platform such as slider attachment platform 300, and a slider (e.g., slider 210 of FIG. 2) attached to the planar surface 306, sandwiches the monolithic element 308c between the planar surface 306 and the slider such that the monolithic element 308c is at least in part in contact with the slider. Preferably, and according to an embodiment, enough force is applied when adhering the slider to the slider attachment platform 300 that the upper surface of the monolithic element 308c is in full contact or nearly full contact with the attached slider. However, in practice some adhesive may flow to between the upper surface of the monolithic element 308c and the attached slider, in which case the monolithic element 308c is at least in part in contact with the slider.

As illustrated in FIG. 3A, the planar surface 306 has a longitudinal direction corresponding to the length of the flexure and a transverse direction perpendicular to the longitudinal direction and corresponding to the width of the flexure. According to an embodiment, and with reference to FIG. 3A, the standoff structure 308 comprises (a) a first longitudinal element 308a positioned toward a first transverse edge 309a of the planar surface 306, with the first longitudinal element 308a extending in the longitudinal direction; (b) a second longitudinal element 308b positioned toward a second transverse edge 309b of the planar surface 306 (opposing the first transverse edge 309a), with the second longitudinal element 308b extending in the longitudinal direction generally or substantially parallel to and separate from the first longitudinal element 308a; and (c) the monolithic element 308c positioned in the transverse direction approximately midway between the first longitudinal element 308a and the second longitudinal element 308b, and positioned in the longitudinal direction approximately midway along the length of the first longitudinal element 308a and the second longitudinal element 308b. According to an embodiment, the height of each of the standoff structure 308 elements (308a, 308b, 308c) is substantially equivalent. Note that variations in the standoff structure 308 may be made and still fall within the scope of related embodiments. For example, additional standoff structure elements may be incorporated, the first and second longitudinal elements 308a, 308b may have varying dimensions (e.g., not necessarily the same length and/or width) or positions relative to each other (e.g., not necessarily precisely parallel), the monolithic element 308c may not necessarily be precisely midway between the longitudinal elements, etc.

According to an embodiment, in order to utilize the monolithic element 308c in absorbing some of the strain energy that may be generated upon curing and the associated shrinkage of the adhesive used to couple the slider (e.g., slider 210 of FIG. 2) with the flexure (e.g., flexure 204 of FIG. 2), generally, and with the slider attachment platform 300, specifically, the slider is adhered to the flexure such that the monolithic element 308c is surrounded by the adhesive.

Figure 3B:
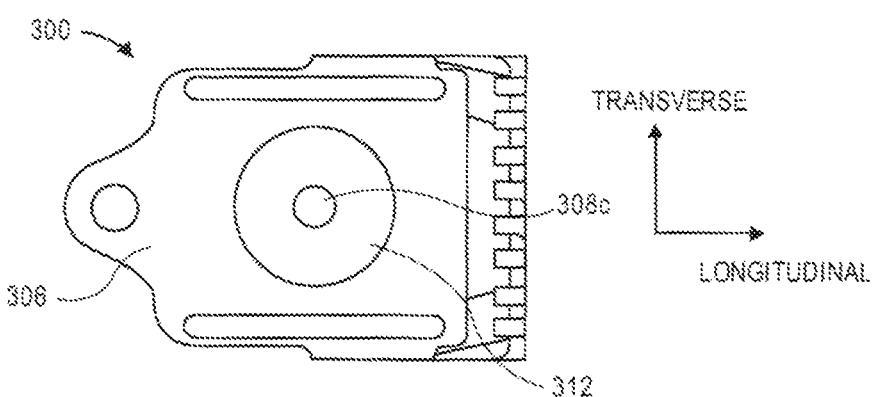
FIG. 3B is a top view illustrating the suspension flexure of FIG. 3A including an adhesive configuration, according to an embodiment.

FIG. 3B is a top view illustrating the suspension flexure of FIG. 3A including an adhesive configuration, according to an embodiment. As FIG. 3B again illustrates the slider attachment platform 300 of the suspension flexure of FIG. 3A, unless described otherwise the operation and functionality of elements depicted in FIG. 3B are similar to like-numbered elements described in reference to FIG. 3A. In reference to FIG. 3B and according to an embodiment, the monolithic element 308c is enclosed by and positioned near the center of an adhesive 312 that is used to adhere a slider (e.g., slider 210 of FIG. 2) to the slider attachment platform 300. Note that the adhesive 312 is depicted in FIG. 3B as being circular for purposes of clarity and simplicity. In practice, the adhesive may not take such a precise circular form. However, it is notable that the monolithic element 308c is completely enclosed and enveloped by the adhesive 312. Stated otherwise, the monolithic element 308c is positioned completely inside the adhesion region of adhesive 312, hence facilitating the ability of the monolithic element 308c to absorb strain induced into the assembly by curing and shrinkage of the adhesive 312, which is described in more detail in reference to FIG. 4B. For example, one could use the monolithic element 308c as a target structure for application of the adhesive 312.

FIG. 4A is a side view illustrating a flexure-slider assembly of an HGA, undergoing delta crown, and FIG. 4B is a side view illustrating a flexure-slider assembly of an HGA, undergoing delta crown, according to an embodiment. For example, the flexure-slider assembly 400 of FIG. 4A may correspond to a portion of the HGA 200 of FIG. 2, and the flexure-slider assembly 450 of FIG. 4B may correspond to an assembly comprising the slider attachment platform 300 of FIGS. 3A, 3B.

The flexure-slider assembly 400 of FIG. 4A is illustrative of a slider 210 attached to a planar surface 206 of a flexure (e.g., flexure 204 of FIG. 2) with use of an adhesive 212. Besides the adhesive 212, the flexure includes standoff elements 208a, 208b at the flexure-slider interface toward the outer transverse edges of the flexure-slider assembly 400 and outside of the adhesive region of adhesive 212. Hence, while the standoff elements 208a, 208b may provide some degree of mechanical support at the outer transverse regions between the flexure planar surface 206 and the slider 210, the curing-related shrinkage 416 (depicted as arrows internal to the adhesive 212) of the adhesive 212 imparts stress over the respective area of adhesion 414 of the planar surface 206 and of the slider 210, where such stress may be relative to the cross-sectional area and the surface area of the adhesive 212. Consequently, such stress may induce strain, or deformation, of one or both of the planar surface 206 and the slider 210 as the curing-related shrinkage 416 "pulls" on the flexure and the slider 210 between the standoff elements 208a, 208b. For example, some of the stress and strain associated with the adhesive 212 is imparted into the flexure planar surface 206 and into the slider 210, while the standoff elements 208a, 208b maintain the relative distance between the planar surface 206 and the slider 210 localized at the standoff regions, thereby causing at least the slider 210 to exhibit crowning (i.e., convex transverse curvature along the length of the slider 210 as depicted in FIG. 4A).

By contrast and with reference to FIG. 4B, the flexure-slider assembly 450 is illustrative of a slider 210 attached to a planar surface 306 of a flexure (e.g., flexure 204 of FIG. 2) with use of an adhesive 312. Besides the adhesive 312, the flexure includes standoff elements 308a, 308b at the flexure-slider interface toward the outer transverse edges of the assembly 450 and outside of the adhesive region of adhesive 312, as well as the monolithic element 308c within the adhesive region of and enclosed by the adhesive 312. Hence, any curing-related shrinkage 456 (depicted as arrows internal to the adhesive 312) of the adhesive 312 imparts stress over the respective areas of adhesion 454a, 454b (collectively, area of adhesion 454) of the planar surface 306 and of the slider 210. Such stress may be relative to the cross-sectional area and the surface area of the adhesive 312 and, therefore, such stress may induce less strain, or deformation, of one or both of the planar surface 306 and the slider 210 than with flexure-slider assembly 400 of FIG. 4A. For example, in addition to being a configuration in which there may be smaller cross-sectional and surface areas of the adhesive 312 (as compared to with the adhesive 212), at least some of the energy associated with the stress and/or strain associated with shrinkage of the adhesive 312 is absorbed by the monolithic element 308c because of its position embedded within the adhesive area 454. Hence, considerably less crowning is likely to occur to the slider 210 in a configuration such as flexure-slider assembly 450 than would otherwise occur in a configuration such as flexure-slider assembly 400.

Recall that slider crown may be caused by temperature changes because the suspension flexure and the slider are typically composed of different materials with different thermal expansion properties (e.g., stainless steel versus AlTiC). The respective thermal expansion/contraction of the flexure planar surface 206 and of the slider 210 is in part dependent upon the amount of curing-related shrinkage of the adhesive 212 as well as the distance between the planar surface and the slider 210. Therefore, in reference to the flexure-slider assembly 400 of FIG. 4A, the larger the span length of the adhesive area 414, the greater the degree of strain between the two different materials of the flexure planar surface 206 and the slider 210 due to the relatively larger adhesive 212 shrinkage area 414. By contrast, in reference to the flexure-slider assembly 450 of FIG. 4B, the smaller the span length of the adhesive area 454, the lesser the degree of strain between the two different materials of the flexure planar surface 306 and the slider 210 due to the relatively smaller adhesive 312 shrinkage area 454. Hence, the standoff structure 308 and adhesive 312 configuration illustrated and described in reference to FIGS. 3A, 3B may provide for limiting both the delta crown and the thermal crown of an associated slider 210.

Figure 3C:
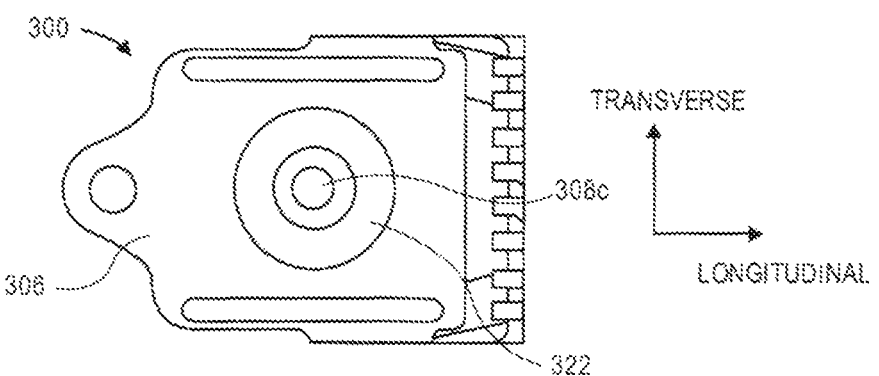
FIG. 3C is a top view illustrating the suspension flexure of FIG. 3A including an adhesive configuration, according to an embodiment.

FIG. 3C is a top view illustrating the suspension flexure of FIG. 3A including an alternative adhesive configuration, according to an embodiment. As FIG. 3C again illustrates the slider attachment platform 300 of the suspension flexure of FIG. 3A, unless described otherwise the operation and functionality of elements depicted in FIG. 3C are similar to like-numbered elements described in reference to FIG. 3A. In reference to FIG. 3C and according to an embodiment, the monolithic element 308c is surrounded by and positioned near the center of a surrounding placement of an adhesive 322 that is used to adhere a slider (e.g., slider 210 of FIG. 2) to the slider attachment platform 300, but while the monolithic element 308c is not in contact with the adhesive 322. Note that the adhesive 322 is depicted in FIG. 3C as being annular for purposes of clarity and simplicity. In practice, the adhesive may not take such a precise annular form. However, it is notable that the monolithic element 308c is completely surrounded by the adhesive 322 but without direct contact with the adhesive 322. Stated otherwise, the monolithic element 308c is positioned inside a surrounding adhesion region of adhesive 322, hence facilitating the ability of the monolithic element 308c to absorb strain induced into the assembly by curing and shrinkage of the adhesive 322.

In reference to FIGS. 3A-3C, and according to an embodiment, the monolithic element 308c of the standoff structure 308 is substantially cylindrical shaped, which can provide a strain energy-absorbing affect to the flexure-slider assembly 300. However, the shape of the monolithic element may vary from implementation to implementation and, therefore, may involve shapes other than a cylinder.

Alternative Suspension Standoff Geometry

Figure 5A:
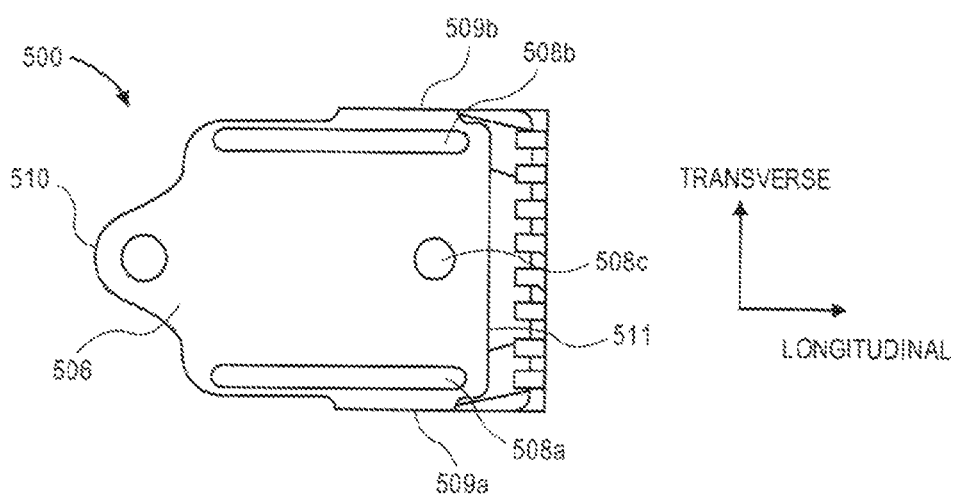
FIG. 5A is a top view illustrating a suspension flexure of an HGA, according to an embodiment.

FIG. 5A is a top view illustrating a suspension flexure of an HGA, according to an embodiment. More specifically, FIG. 5A illustrates a slider attachment platform 500 of a flexure, where the slider attachment platform comprises a planar surface 506 and a standoff structure comprising a plurality of standoff elements 508a, 508b, 508c (referred to herein collectively as "standoff structure 508") having a particular pattern or configuration. The planar surface 506 has a proximal end 510 and a distal end 511.

According to an embodiment, standoff structure 508 comprises a monolithic element 508c. Therefore, a corresponding HGA incorporating a flexure having a slider attachment platform such as slider attachment platform 500, and a slider (e.g., slider 210 of FIG. 2) attached to the planar surface 506, sandwiches the monolithic element 508c between the planar surface 506 and the slider such that the monolithic element 508c is at least in part in contact with the slider. Preferably, and according to an embodiment, enough force is applied when adhering the slider to the slider attachment platform 500 that the upper surface of the monolithic element 508c is in full contact or nearly full contact with the attached slider. However, in practice some adhesive may flow to between the upper surface of the monolithic element 508c and the attached slider, in which case the monolithic element 508c is at least in part in contact with the slider.

As illustrated in FIG. 5A, the planar surface 506 has a longitudinal direction corresponding to the length of the flexure and a transverse direction perpendicular to the longitudinal direction and corresponding to the width of the flexure. According to an embodiment, and with reference to FIG. 5A, the standoff structure 508 comprises (a) a first longitudinal element 508a positioned toward a first transverse edge 509a of the planar surface 506, with the first longitudinal element 508a extending in the longitudinal direction; (b) a second longitudinal element 508b positioned toward a second transverse edge 509b of the planar surface 506 (opposing the first transverse edge 509a), with the second longitudinal element 508b extending in the longitudinal direction generally or substantially parallel to and separate from the first longitudinal element 508a; and (c) the monolithic element 508c positioned in the transverse direction approximately midway between the first longitudinal element 508a and the second longitudinal element 508b, and positioned in the longitudinal direction toward the distal end 511. The precise longitudinal location of the monolithic element 508c may vary from implementation to implementation, however, the monolithic element 508c is preferably positioned closer to the distal end 511 than to the proximal end 510 and closer to the distal end 511 than to the midway point of the first and second longitudinal elements 508a, 508b along the longitudinal direction. According to an embodiment, the height of each of the standoff structure 508 elements (508a, 508b, 508c) is substantially equivalent. Note that variations in the standoff structure 508 may be made and still fall within the scope of related embodiments. For example, additional standoff structure elements may be incorporated, the first and second longitudinal elements 508a, 508b may have varying dimensions (e.g., not necessarily the same length and/or width) or positions relative to each other (e.g., not necessarily precisely parallel), the monolithic element 508c may not necessarily be precisely midway between the longitudinal elements, etc.

According to an embodiment, in order to utilize the monolithic element 508c in absorbing some of the strain energy that may be generated upon curing and the associated shrinkage of the adhesive used to couple the slider (e.g., slider 210 of FIG. 2) with the flexure (e.g., flexure 204 of FIG. 2), generally, and with the slider attachment platform 500, specifically, the slider is adhered to the flexure such that the monolithic element 508c is surrounded by the adhesive.

Figure 5B:
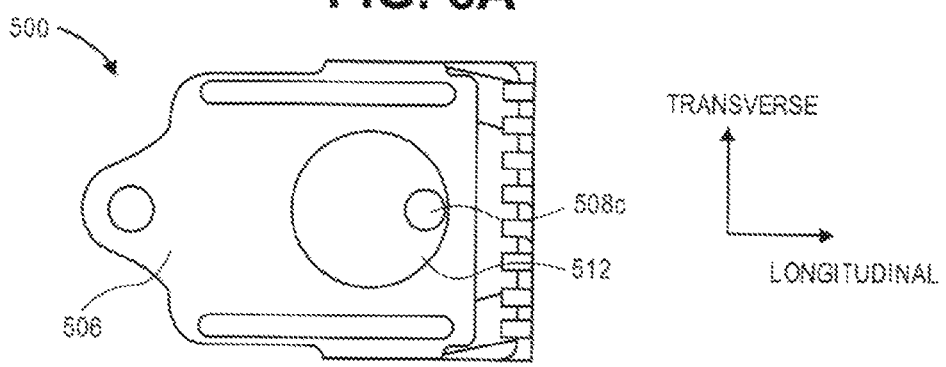
FIG. 5B is a top view illustrating the suspension flexure of FIG. 5A including an adhesive configuration, according to an embodiment.

FIG. 5B is a top view illustrating the suspension flexure of FIG. 5A including an adhesive configuration, according to an embodiment. As FIG. 5B again illustrates the slider attachment platform 500 of the suspension flexure of FIG. 5A, unless described otherwise the operation and functionality of elements depicted in FIG. 5B are similar to like-numbered elements described in reference to FIG. 5A. In reference to FIG. 5B and according to an embodiment, the monolithic element 508c is enclosed by and positioned near the distal edge or area of an adhesive 512 that is used to adhere a slider (e.g., slider 210 of FIG. 2) to the slider attachment platform 500. Note that the adhesive 512 is depicted in FIG. 5B as being circular for purposes of clarity and simplicity. In practice, the adhesive may not take such a precise circular form. However, it is notable that the monolithic element 508c is completely enclosed and enveloped by the adhesive 512. Stated otherwise, the monolithic element 508c is positioned completely inside the adhesion region of adhesive 512, hence facilitating the ability of the monolithic element 508c to absorb strain induced into the assembly by curing and shrinkage of the adhesive 512, similar to the scenario described in reference to FIG. 4B. For example, one could use the monolithic element 508c as a target structure for application of the adhesive 512.

Figure 6:
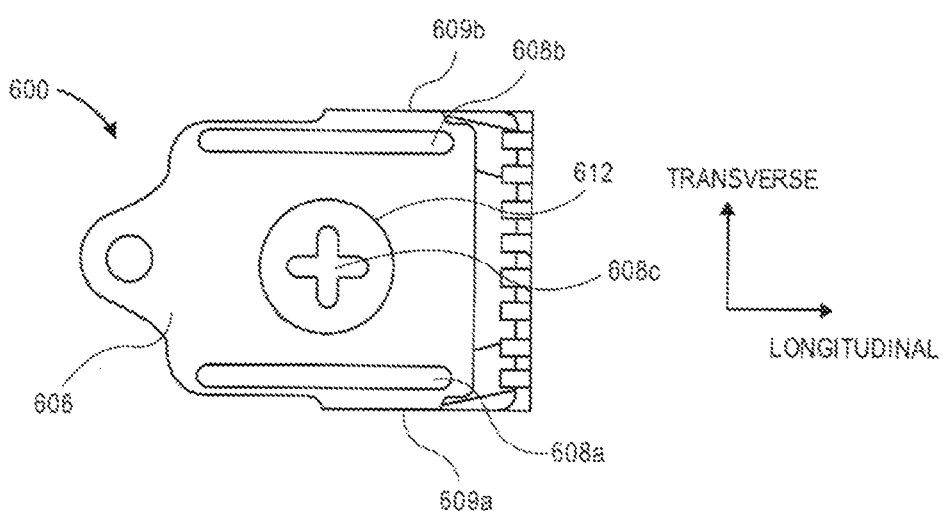
FIG. 6 is a top view illustrating a suspension flexure of an HGA, according to an embodiment.

As previously noted, the shape of the monolithic element may vary from implementation to implementation and, therefore, may involve shapes other than a cylinder. FIG. 6 provides one example of an alternative shape for the monolithic element.

FIG. 6 is a top view illustrating a suspension flexure of an HGA, according to an embodiment. More specifically, FIG. 6 illustrates a slider attachment platform 600 of a flexure, where the slider attachment platform comprises a planar surface 606 and a standoff structure comprising a plurality of standoff elements 608a, 608b, 608c (referred to herein collectively as "standoff structure 608") having a particular pattern or configuration.

According to an embodiment, standoff structure 608 comprises a monolithic element 608c that is substantially x-shaped (or "+-shaped"), for example, as depicted in FIG. 6. Therefore, a corresponding HGA incorporating a flexure having a slider attachment platform such as slider attachment platform 600, and a slider (e.g., slider 210 of FIG. 2) attached to the planar surface 606, sandwiches the monolithic element 608c between the planar surface 606 and the slider such that the monolithic element 608c is at least in part in contact with the slider.

As illustrated in FIG. 6, the planar surface 606 has a longitudinal direction corresponding to the length of the flexure and a transverse direction perpendicular to the longitudinal direction and corresponding to the width of the flexure. According to an embodiment, and with reference to FIG. 6, the standoff structure 608 comprises (a) a first longitudinal element 608a positioned toward a first transverse edge 609a of the planar surface 606, with the first longitudinal element 608a extending in the longitudinal direction; (b) a second longitudinal element 608b positioned toward a second transverse edge 609b of the planar surface 606 (opposing the first transverse edge 609a), with the second longitudinal element 608b extending in the longitudinal direction generally or substantially parallel to and separate from the first longitudinal element 608a; and (c) the monolithic element 608c positioned in the transverse direction approximately midway between the first longitudinal element 608a and the second longitudinal element 608b, and positioned in the longitudinal direction approximately midway along the length of the first longitudinal element 608a and the second longitudinal element 608b. According to an embodiment, the height of each of the standoff structure 608 elements (608a, 608b, 608c) is substantially equivalent. Note that variations in the standoff structure 608 may be made and still fall within the scope of related embodiments. For example, additional standoff structure elements may be incorporated, the first and second longitudinal elements 608a, 608b may have varying dimensions (e.g., not necessarily the same length and/or width) or positions relative to each other (e.g., not necessarily precisely parallel), the monolithic element 608c may not necessarily be precisely midway between the longitudinal elements, etc.

According to an embodiment, in order to utilize the monolithic element 608c in absorbing some of the strain energy that may be generated upon curing and the associated shrinkage of the adhesive used to couple the slider (e.g., slider 210 of FIG. 2) with the flexure (e.g., flexure 204 of FIG. 2), generally, and with the slider attachment platform 600, specifically, the slider is adhered to the flexure such that the monolithic element 608c is surrounded by the adhesive 612 as depicted in FIG. 6 for example.

Method of Manufacturing a Head Gimbal Assembly

Figure 7:
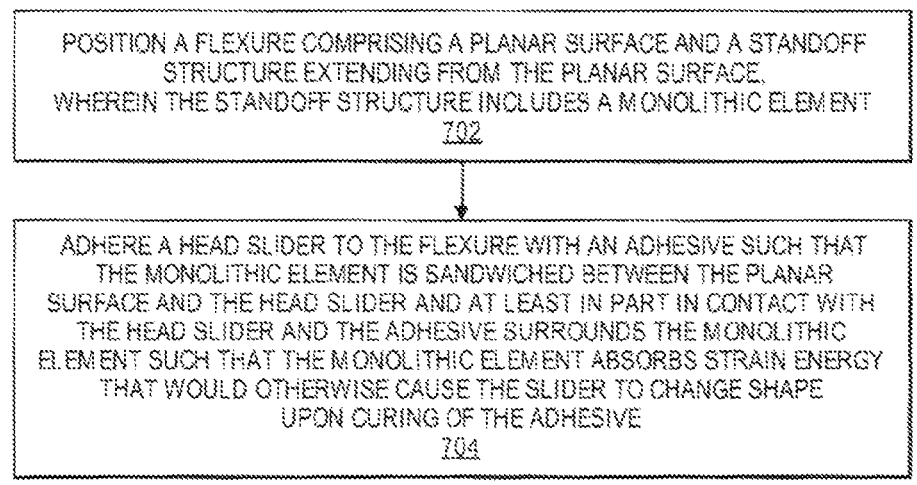
FIG. 7 is a flow diagram illustrating a method of manufacturing a head gimbal assembly, according to an embodiment.

FIG. 7 is a flow diagram illustrating a method of manufacturing a head gimbal assembly, according to an embodiment. In a method of manufacturing a head gimbal assembly to inhibit deformation of a head slider, at block 702 a flexure is positioned which comprises a planar surface and a standoff structure extending from the planar surface, where the standoff structure includes a monolithic element. For a non-limiting example, flexure 300 (FIGS. 3A, 3B), which comprises a planar surface 306 (FIGS. 3A, 3B) and a standoff structure 308 (FIGS. 3A, 3B) extending from the planar surface 306, where the standoff structure 308 includes a monolithic element 308c (FIGS. 3A, 3B), is positioned for coupling with a head slider (e.g., slider 210 of FIG. 2). Similarly, at block 702, flexure 500 (FIGS. 5A, 5B) and/or flexure 600 (FIG. 6) may be positioned for coupling with a head slider.

With reference back to FIG. 7, at block 704 a head slider is adhered to the flexure with an adhesive such that (a) the monolithic element is sandwiched between the planar surface and the head slider and at least in part in contact with the head slider, and (b) the adhesive surrounds the monolithic element such that the monolithic element absorbs strain energy that would otherwise cause the slider to change shape, or deform, upon curing of the adhesive. For example, a head slider (e.g., slider 210 of FIG. 2) is adhered to the flexure 300 (FIGS. 3A, 3B) with an adhesive 312 (FIG. 3B), or adhesive 322 of FIG. 3C, such that the monolithic element 308c (FIGS. 3A, 3B) is sandwiched between the planar surface 306 (FIGS. 3A, 3B) and the head slider 210 and at least in part in contact with the head slider 210, and the adhesive 312 (or 322) surrounds the monolithic element 308c such that the monolithic element 308c absorbs strain energy that would otherwise cause the slider 210 to change shape, or deform, upon curing of the adhesive 312 (or 322) (see, e.g., FIGS. 4A, 4B). Similarly, at block 704, head slider (e.g., slider 210 of FIG. 2) may be adhered to the flexure 500 (FIGS. 5A, 5B) and/or flexure 600 (FIG. 6) with a respective adhesive 512 (FIG. 5B) or 612 (FIG. 6) such that the respective monolithic element 508c (FIGS. 5A, 5B) or 608c (FIG. 6) is sandwiched between the respective planar surface 506 (FIGS. 5A, 5B) or 606 (FIG. 6) and the head slider 210, and the respective adhesive 512 or 612 surrounds the respective monolithic element 508c or 608c, thereby absorbing strain energy that would otherwise cause the slider 210 to deform upon curing of the adhesive 512 or 612.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A head gimbal assembly for a hard disk drive, comprising:
   a flexure comprising a planar surface and a standoff structure extending from said planar surface, wherein said standoff structure includes a monolithic element; and
   a slider adhered to said flexure with an adhesive such that said monolithic element is sandwiched between said planar surface and said slider and at least in part in contact with said slider;
   wherein said monolithic element is surrounded by said adhesive such that said monolithic element absorbs strain energy associated with curing of said adhesive;
   wherein said planar surface of said flexure has a proximal end, a distal end, a longitudinal direction corresponding to a length of said flexure and a transverse direction perpendicular to said longitudinal direction, and wherein said standoff structure further includes:
   a first longitudinal element positioned toward a first transverse edge of said planar surface and extending in the longitudinal direction, and
   a second longitudinal element positioned toward a second transverse edge of said planar surface, opposing said first transverse edge, and extending in the longitudinal direction substantially parallel to and a separate component from said first longitudinal element;
   wherein said monolithic element is positioned in the transverse direction approximately midway between said first longitudinal element and said second longitudinal element and positioned in the longitudinal direction between said distal end and midway along the length of said first longitudinal element and said second longitudinal element.

2. The head gimbal assembly of claim 1, wherein said monolithic element is substantially cylindrical shaped.

3. The head gimbal assembly of claim 1, wherein said adhesive encloses said monolithic element positioned near a distal edge of said adhesive.

4. The head gimbal assembly of claim 1, wherein said adhesive surrounds said monolithic element such that said monolithic element absorbs strain energy that would otherwise cause said slider to deform upon curing of said adhesive.

5. A hard disk drive comprising:
- at least one recording disk medium rotatably mounted on a spindle;
- a head slider comprising a read-write transducer configured to read from and to write to said at least one disk medium;
- a voice coil actuator configured to move said head slider to access portions of said at least one disk medium;
- a head gimbal assembly coupled with said voice coil actuator, said head gimbal assembly comprising a flexure comprising a planar surface and a standoff structure extending from said planar surface and wherein said standoff structure includes a monolithic element; and
- adhesive adhering said head slider to said flexure such that said monolithic element is sandwiched between said planar surface and said head slider and at least in part in contact with said head slider and said adhesive surrounds said monolithic element such that said monolithic element absorbs strain energy associated with curing of said adhesive;
- wherein said planar surface of said flexure has a proximal end, a distal end, a longitudinal direction corresponding to a length of said flexure and a transverse direction perpendicular to said longitudinal direction, and wherein said standoff structure further includes:
  - a first longitudinal element positioned toward a first transverse edge of said planar surface and extending in the longitudinal direction, and
  - a second longitudinal element positioned toward a second transverse edge of said planar surface, opposing said first transverse edge, and extending in the longitudinal direction substantially parallel to and a separate component from said first longitudinal element;
- wherein said monolithic element is positioned in the transverse direction approximately midway between said first longitudinal element and said second longitudinal element and positioned in the longitudinal direction between said distal end and midway along the length of said first longitudinal element and said second longitudinal element.

6. The hard disk drive of claim 5, wherein said adhesive encloses said monolithic element positioned near an edge of said adhesive.

7. The hard disk drive of claim 5, wherein said adhesive surrounds said monolithic element such that said monolithic element absorbs strain energy that would otherwise cause said slider to deform upon curing of said adhesive.

8. A method of manufacturing a head gimbal assembly to inhibit deformation of a head slider, the method comprising:
- positioning a flexure comprising a planar surface and a standoff structure extending from said planar surface, wherein said standoff structure includes a monolithic element; and
- adhering said head slider to said flexure with an adhesive such that said monolithic element is sandwiched between said planar surface and said head slider and at least in part in contact with said head slider and said adhesive surrounds said monolithic element such that said monolithic element absorbs strain energy that would otherwise cause said slider to change shape upon curing of said adhesive;
- wherein said planar surface of said flexure has a proximal end, a distal end, a longitudinal direction corresponding to a length of said flexure and a transverse direction perpendicular to said longitudinal direction, and wherein said standoff structure further includes:
  - a first longitudinal element positioned toward a first transverse edge of said planar surface and extending in the longitudinal direction, and
  - a second longitudinal element positioned toward a second transverse edge of said planar surface, opposing said first transverse edge, and extending in the longitudinal direction substantially parallel to and a separate component from said first longitudinal element;
- wherein said monolithic element is positioned in the transverse direction approximately midway between said first longitudinal element and said second longitudinal element and positioned in the longitudinal direction between said distal end and midway along the length of said first longitudinal element and said second longitudinal element.

* * * * *